W. W. LASKER.
RIBBON SPOOL.
APPLICATION FILED AUG. 3, 1910.
1,013,882.
Patented Jan. 9, 1912.
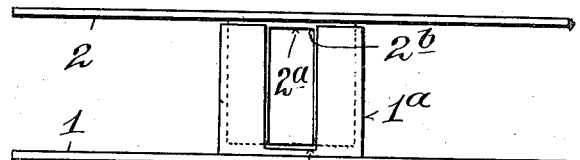
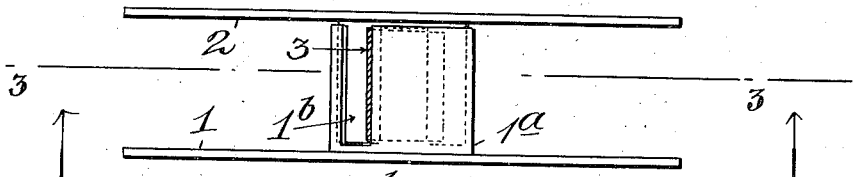
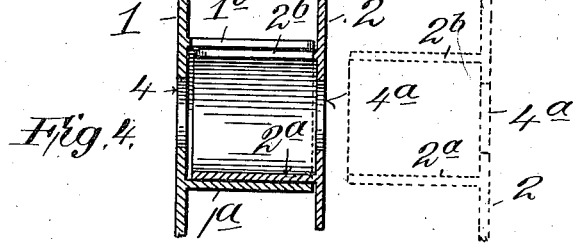
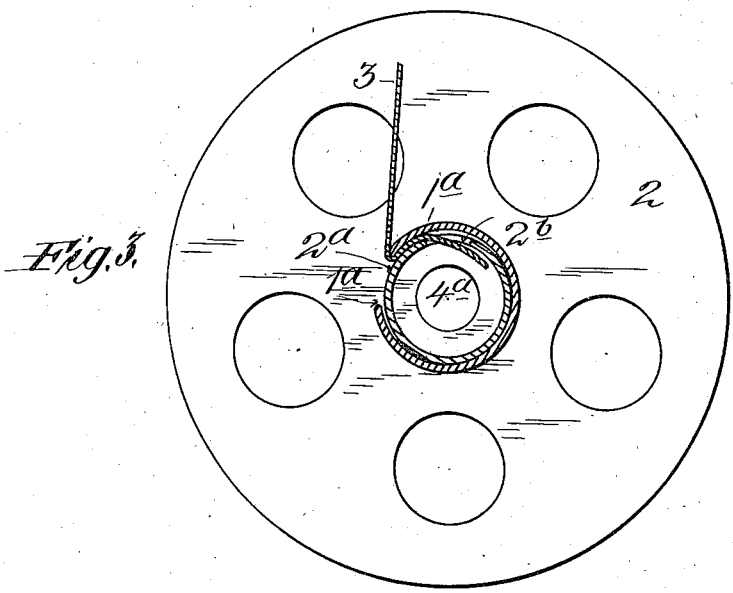
Witnesses:
Inventor
W. W. Lasker,
By his Attorney
P. F. Bourne

UNITED STATES PATENT OFFICE.

WILLIAM W. LASKER, OF BROOKLYN, NEW YORK.

RIBBON-SPOOL.

1,013,882. Specification of Letters Patent. Patented Jan. 9, 1912.

Application filed August 3, 1910. Serial No. 575,294.

*To all whom it may concern:*

Be it known that I, WILLIAM W. LASKER, a citizen of the United States, and a resident of Brooklyn, in the county of Kings and State of New York, have invented certain new and useful Improvements in Ribbon-Spools, of which the following is a specification.

The object of my invention is to provide a simple and effective spool or reel for receiving ribbon, tape, and the like, and my invention has particular reference to spools for holding inking ribbons in typewriting and analogous machines.

My invention comprises a spool provided with opposed disks or plates each having a hollow hub open at its outer end, one hub being adapted to receive the other in telescopic manner, said hubs having openings adapted to aline to receive the end portion of the ribbon or the like, said disks and hubs then being rotated relatively to each other to clamp or grasp the ribbon between them, whereby the ribbon may be readily applied to and detached from the spool.

In the accompanying drawings I have illustrated an embodiment of my invention, wherein, Figure 1 is an edge view of my improved ribbon spool adapted for a typewriting or similar machine; Fig. 2 is a similar view showing the parts in a different position; Fig. 3 is a section on the plane of the line 3, 3, in Fig. 2; and Fig. 4 is a section on the plane of the line 4, 4, in Fig. 1.

Similar numerals of reference indicate corresponding parts in the several views.

The numerals 1, 2 indicate disks or plates provided respectively with hollow hubs $1^a$, $2^a$, which hubs have openings or slots $1^b$, $2^b$, of suitable width, which slots by preference open through the outer ends of said hubs. The hub $2^a$ is shown fitting within the hub $2^b$, and a somewhat snug fit is effected so that said hubs will remain in relative positions during use, by friction or spring grip between them. Said hubs and disks may be adjusted toward or from each other, within limits, to accommodate ribbons of different widths. The disks also are provided with openings 4, $4^a$ in line with the bores of the hubs to receive a shaft or stud with or upon which the spool may rotate.

To apply a ribbon to the spool the disks are rotated relatively to each other so that the openings $1^b$, $2^b$, are alined, as illustrated in Figs. 1 and 4, and then the end portion of the ribbon 3 is passed through said openings into the hub and the disks and hubs are then rotated relatively to each other, whereby the ribbon will be gripped between the adjacent portions of the hubs as shown in Fig. 3. Thereby the ribbon will be securely attached to the hubs and said hubs then serve in the nature of a shaft around which the ribbon will be wound when the spool is rotated. To release the ribbon the disks and hubs are rotated reversely to that described to bring the openings $1^b$, $2^b$, into alinement, when the end part of the ribbon may be pulled out of the hub. At such time also the disks and hubs may be entirely separated thereby permitting the operator to drop the ribbon from the spool without handling the ribbon. The hubs, when adjusted toward and from each other to accommodate ribbons of different widths between the disks, will be securely retained in adjusted positions by reason of the ribbon being squeezed between the hubs, the parts thereby remaining securely locked together whatever be the width of the ribbon wound on the hubs.

My invention is simple and cheap to manufacture, the spool may be readily applied to and removed from its supporting shaft or stud, and is convenient and effective in operation.

Having now described my invention what I claim is:—

In a ribbon spool, a spool member comprising a section of a hub and a disk from the side of which the hub projects, said hub section having a slot extending from its outer end toward said disk and adapted to receive a typewriter ribbon, a second spool member comprising a section of a hub and a disk from the side of which the section of the hub projects, said last mentioned hub section having a slot extending from its outer end toward said disk, the said hub sections being telescopically connected and in such relation as to hold a portion of said ribbon therebetween.

Signed at East Lyme in the county of New London and State of Connecticut this sixteenth day of July, A. D. 1910.

WILLIAM W. LASKER.

Witnesses:
LINCOLN G. LUCE,
HOMER J. B. HAMFLEY.